United States Patent [19]

Morihiro et al.

[11] Patent Number: 5,121,423

[45] Date of Patent: Jun. 9, 1992

[54] COMMUNICATION UNIT COMPRISING CALLER IDENTIFICATION FUNCTION AND CALLER IDENTIFYING METHOD IN A DIGITAL COMMUNICATION NETWORK

[75] Inventors: Katsurada Morihiro; Shimonaga Sadaaki, both of Nara, Japan

[73] Assignee: Sharp Kabushiki Kaisha, Osaka, Japan

[21] Appl. No.: 550,396

[22] Filed: Jul. 10, 1990

[30] Foreign Application Priority Data

Jul. 13, 1989 [JP] Japan ................... 1-181985
Jul. 13, 1989 [JP] Japan ................... 1-181986

[51] Int. Cl.⁵ .......................................... H04M 1/57
[52] U.S. Cl. ................................. 379/142; 379/100; 379/245; 379/396
[58] Field of Search ............... 379/142, 245, 246, 247, 379/396, 100

[56] References Cited

U.S. PATENT DOCUMENTS

| 4,591,665 | 5/1986 | Foster et al. | 379/142 |
| 4,723,273 | 2/1988 | Diesel et al. | 379/211 |
| 4,894,861 | 1/1990 | Fujioka | 379/374 |
| 4,899,358 | 2/1990 | Blakley | 379/67 |
| 4,922,490 | 5/1990 | Blakley | 379/142 X |
| 4,958,153 | 9/1990 | Murata et al. | 379/142 X |

FOREIGN PATENT DOCUMENTS

| 0355777 | 2/1990 | European Pat. Off. | 379/142 |
| 0086652 | 4/1988 | Japan | 379/142 |
| 0002461 | 1/1989 | Japan | 379/142 |
| 0089846 | 4/1989 | Japan | 379/142 |
| 0109946 | 4/1989 | Japan | 379/142 |
| 0295556 | 11/1989 | Japan | 379/142 |
| 0015756 | 1/1990 | Japan | 379/142 |
| 0058459 | 2/1990 | Japan | 379/142 |
| 0058463 | 2/1990 | Japan | 379/142 |
| 0355777 | 2/1990 | Japan | 379/142 |

OTHER PUBLICATIONS

"The Intelligent Network Concept", J. S. Doyle et al., *IEEE Trans. on Communications*, vol. 36, No. 12, Dec. 1988, pp. 1296-1301.

Primary Examiner—Thomas W. Brown
Attorney, Agent, or Firm—David G. Conlin; Robert F. O'Connell

[57] ABSTRACT

A communication unit utilizes a caller management unit which monitors in-house lines and detects a caller side calling code included in a calling set up message applied at the time of reference. A control unit stores the detected calling code in one memory region of a memory and reads out the stored calling code from the memory region in response to an output request to produce information corresponding to the calling code. The management unit displays the information produced by the control unit. The memory has another memory region for storing a plurality of predetermined calling codes and caller specification information corresponding to each calling code. The control unit stores the detected calling code into the one memory region in response to a non-response detection to reference by the line monitor. The control unit further makes a determination whether a calling code coinciding with the calling code stored in the one memory region is stored in the other memory region in response to an output request and displays the caller specification information corresponding to the calling code when coincidence is detected, while displaying only the detected calling code when a non-coincidence is detected.

6 Claims, 4 Drawing Sheets

FIG.1
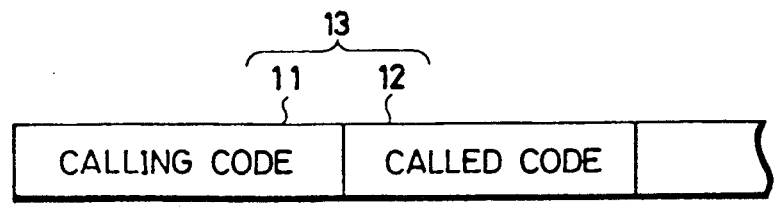
FIG.3
| CALLING CODE | CALLING CODE | DATA (CALLER'S NAME) |
|---|---|---|
| A ····· | 1 2 3 - 0 0 0 1 | A CAMPANY |
| B ····· | 4 5 6 - 0 0 0 2 | B CO.LTD |
| C ····· | | C |
15b, 15a
FIG.4
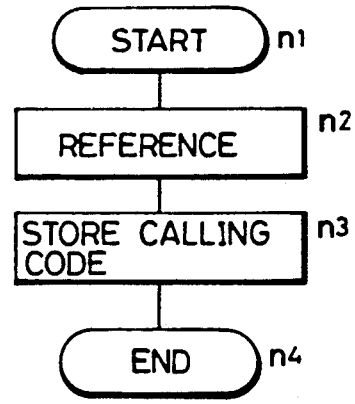

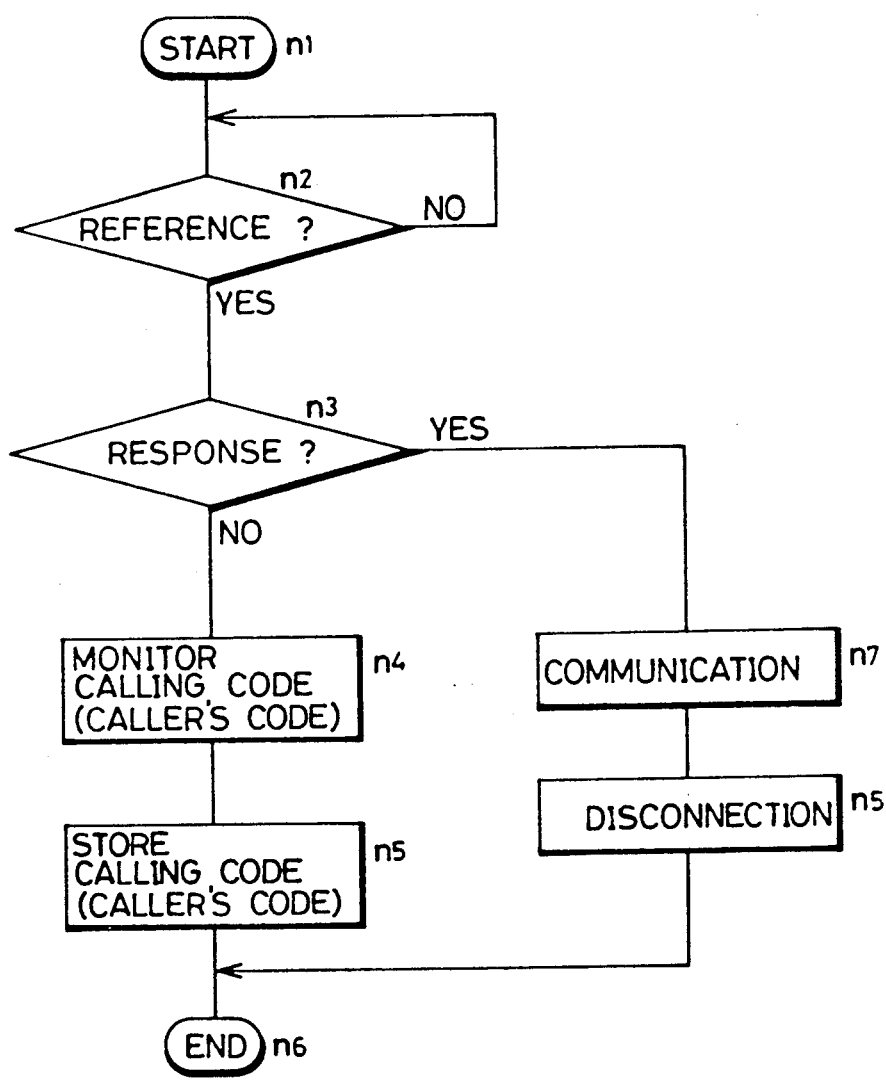

COMMUNICATION UNIT COMPRISING CALLER IDENTIFICATION FUNCTION AND CALLER IDENTIFYING METHOD IN A DIGITAL COMMUNICATION NETWORK

BACKGROUND OF THE INVENTION

1. Field of the Invention

The invention relates generally to communication units in a digital communication network, and more particularly, to a communication unit that communicates via Integrated Services Digital Network (ISDN) line. The invention has particular applicability to a caller identification unit in the responding communication unit and the identification method.

2. Description of the Background Art

A telephone set connected to a subscriber line is one of the conventional communication units. Regarding telephone sets, there is an automatic answering telephone set that can record the caller's speech at the time of the responder's absence.

This automatic answering telephone set is capable of sending a given message to the caller and record the caller's message automatically, in response to a reference at the time of the user's absence. The user can reproduce the messages of the callers who called during the user's absence by operating a reproduction switch.

Unfortunately, this requires communication charge unnecessarily because the line of the automatic answering telephone set is in a connected state at the time.

Also, the user could not find out who the caller was if the caller did not record a message.

Furthermore, even though the caller's message was reproduced, there were times when the user could not make out where he/she should correspond, just from the message despite the identification of the caller.

There was also an inconvenience that every caller could not be identified unless all the messages of all the callers were reproduced, which would waste some period of time.

A communication unit connected to the ISDN line comprising a memory for storing the calling codes of the caller during the absence of the user is disclosed in Japanese Patent Laying Open No. 64-89641. This communication unit of the prior art comprises a unit for setting the absence state of the user, a memory device for storing the caller's telephone number transmitted via the ISDN line in response to the set up absence state, and a unit for reading the telephone number from the memory device and sending the same as the responding side specification information in the calling information to the ISDN line in response to a line connection instruction applied by the user.

This prior unit requires the set up of the user's absence state. If this absence state is not set up, the calling code of the caller could not be stored at the time of the absence of the user.

SUMMARY OF THE INVENTION

An object of the present invention is to provide a communication unit that can readily identify the caller at the time of the absence of the user.

Another object of the invention is to provide a method for readily identifying the caller at the time of the absence of the user in a communication unit connected to a digital communication line.

The communication unit in accordance with the present invention comprises a unit monitoring the in-house line for detecting a caller's calling code included in the calling set up message transmitted to the response side via the digital communication line, a unit for storing the detected calling code to a predetermined region in a memory, a unit for reading out the calling code stored in the predetermined region of the memory in response to a read out request and producing the information corresponding to the read out calling code, and a unit for outputting this produced information.

The storing unit comprises a unit for storing the detected calling code to a predetermined region of the memory in response to the detection of non-response to the reference of the responding side by the detecting unit.

The memory includes an additional memory region, other than the predetermined region, for storing a plurality of calling codes and the caller specification information corresponding to each calling code.

The producing unit comprises a unit for reading out the detected calling code from a predetermined memory region in response to a read out request and making a determination whether or not a calling code coinciding with the detected calling code is stored in the additional memory region, a unit for reading out the caller specification information corresponding to that calling code from the additional memory region in response to a coincidence detection by the determining unit for application along with the detected calling code to an output unit, and a unit for providing only the detected calling code to the output unit in response to a non-coincidence detection.

In accordance with the above structure, the calling code of the caller is stored in the memory without responding by line connection even when there is a reference during the users absence. The user can identify the callers by reading out the stored contents of the memory at an appropriate time.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 schematically shows the contents of the calling set up message in a digital communication network to which the present invention is applied.

FIG. 3 schematically shows the stored contents of the memory of FIG. 2.

FIG. 4 is a flow diagram showing the operation of the communication unit of FIG. 2 at the time of reference.

FIG. 7 is a flow diagram showing the operation of the communication unit at the time of reference in accordance with another embodiment of the present invention.

DESCRIPTION OF THE PREFERRED EMBODIMENTS

In a digital communication network called ISDN, a communication protocol corresponding to the OSI basic reference model (Open System Interconnection Model) is defined for the purpose of effective and smooth communication between a terminal and the network, and between networks. The system of the protocol of ISDN is of a layered structure constructed by a first layer to a seventh layer, with the protocol defined for each layer.

The third layer of this ISDN is called the network layer for implementing the control of the set up, holding and release of the communication path. In the protocol of the third layer, the inclusion of the calling code 11 and the called code 12 is defined as the information element of the calling set up message 13, as shown in FIG. 1.

The calling code 11 is the information for specifying a calling side, while the called code 12 is the information for specifying a response side.

The communication unit checks the coincidence/non-coincidence between the code (address) allotted to itself and the called code, to determine whether the calling is made to itself or not.

At the time of calling, the communication unit sends message as shown in FIG. 1 to specify the calling side and the responding side.

In accordance with the present invention, the management and specification of the caller at the time of the absence of the user is performed by utilizing the calling code included in the set up message transmitted at the time of reference.

Figure 2:
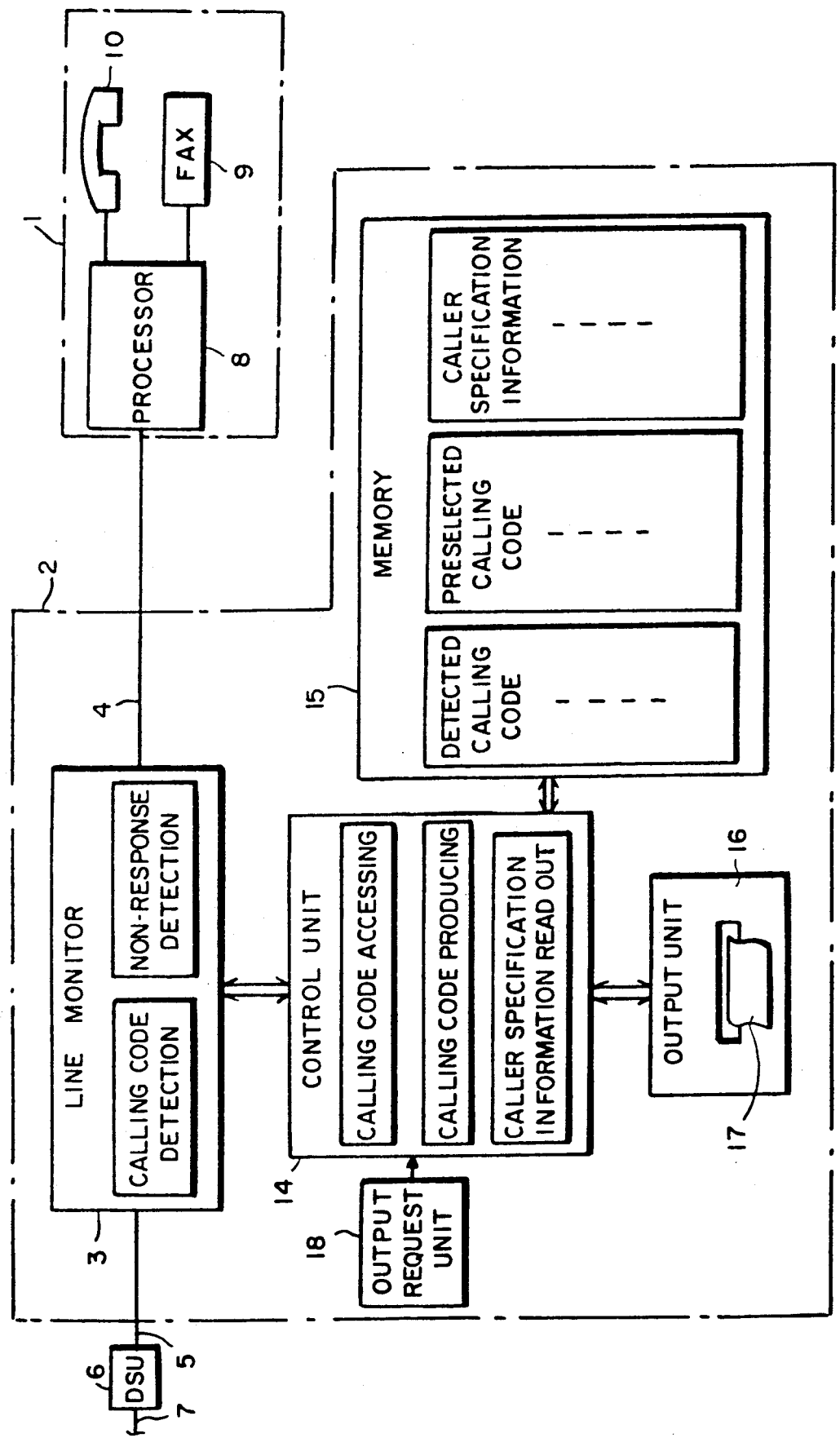
FIG. 2 is a block diagram schematically showing the whole structure of the communication unit in accordance with one embodiment of the present invention.

FIG. 2 schematically shows the whole structure of the communication unit in accordance with one embodiment of the invention. Referring to FIG. 2, the communication unit comprises a terminal unit 1 communicating via an ISDN line 7 in practice, and a communication management unit 2 for monitoring information transmitted on lines 4 and 5.

The terminal unit 1 comprises a facsimile unit 9 capable of facsimile communication under G3 mode and/or G4 mode, a hand set 10 capable of speech communication under telephone mode, and a processing unit 8 for controlling the connection between facsimile unit 9, hand set 10 and ISDN line 7. The processing unit 8 has various required input keys such as function keys and ten keys provided for setting the transmission mode and inputting the response code by operating the input keys. The processing circuit 8 is formed of a microcomputer for example, to create a set up message as shown in FIG. 1 in response to a transmission request from facsimile unit 9 or hand set 10 through the processing circuit 8, and sends the same to line 4. The processing circuit 8 also comprises a memory for storing information (sub address) specifying facsimile unit 9 and hand set 10, as well as the information specifying ISDN line 7 to which terminal unit 1 is connected. Different sub addresses are allotted to facsimile unit 9 and hand set 10.

At the time of reference, the coincidence/non-coincidence of the called code included in the set up message transmitted via lines 5 and 4 and the address stored in processing unit 8 (comprised of sub address and line 7 specification address) is detected by processing unit 8, whereupon the calling of facsimile unit 9 and hand set 10 is carried out in response to the detected result.

The communication management unit 2 comprises a line monitor 3 coupled to lines 4 and 5 for monitoring information on these lines, a control unit 14 coupled to line monitor 3 for performing a predetermined control operation in response to the detected information from line monitor 3, a memory 15 coupled to control unit 14 for storing plurality of predetermined callers' codes and their corresponding names, an output unit 16 coupled to control unit 14 formed of a printer for example, and an output request unit 18 formed of a switch for example, to apply an output request instruction to control unit 14.

The line monitor 3 monitors the S point information of lines 4 and 5. S point is a reference point in which ISDN standard interface is applied, as well as a connection point between standard in-house equipment (terminal unit 1) and in-house control unit (DSU) controlling the line connection. The line monitor 3 detects a calling code 11 (refer to FIG. 1) included in a set up message transmitted to lines 4 and 5 at the time of reference.

The control unit 14 is formed of a microcomputer for example, to store the calling code of the caller from line manager 3, to detect the coincidence/non-coincidence thereof with the stored contents of memory 14, and to output the calling code of the caller and the name thereof.

Memory 15 is a readable/writable memory, comprising region 15a for storing plurality of predetermined calling codes and names corresponding to each calling code, and a region 15b for storing the calling code included in the set up information, as shown in FIG. 3. The name of a caller may be an individual name, a company name, or a section name where the caller belongs. The calling code may be a code of facsimile unit 9, as well as a telephone number of hand set 10. Furthermore, the calling code may merely be a subscriber line specification address excluding the sub address for the terminal unit specification. That is to say, the calling code/called code includes a line specification address, a subaddress specifying a terminal unit (hand set, facsimile unit, etc.) connected to that line, whereupon a caller is specified by using an appropriate address information in the calling code.

Output unit 16 is formed of a printer printing out the contents of memory 14 read out by control unit 14 on a recording paper 17.

The output unit 16 may be a visual display unit such as a liquid crystal display unit or a CRT (Cathode Ray Tube) display unit, or also a speech output display unit utilizing speech synthesizing integrated circuit for example.

Line 5 is connected to ISDN line 7 via DSU 6. DSU 6 is a line terminator (data circuit terminating equipment) which terminates the digital transmission path (ISDN line) for controlling the communication between the in-house terminal unit 1 and line 7. DSU 6 comprises controlling functions such as conversion of signal protocol between line 7 and line 5, conversion of signal type, and adjustment of transmission rates.

The operation at the time of reference will be described with reference to the operation flow diagram of FIG. 4.

A caller operates the operation keys provided on processing unit 8 to input destination identification information (called code 12) at the time of communication by facsimile unit 9 or hand set 10. The processing unit 8 is brought to a transmission state by an off-hook information from hand set 10 or a transmission instruction input from the operation key to create a calling set up message 13 as shown in FIG. 1. This message is sent to ISDN line 7 via lines 4 and 5, and DSU 6. Though not clearly shown, this set up message includes a signal (bit) indicating that it is a calling information.

At a response side, the set up message is transmitted to line 5 via DSU 6. On detecting reference, line monitor 3 extracts the calling code 11 from the transmitted message and applies the same to control circuit 14 (step n2). The set up message 13 transmitted to line 5 is also applied to the processing unit 8 of the terminal unit 1 via line 4. The processing unit 8 compares the called code included in the set up message with the terminal unit specification information previously stored to call the corresponding terminal equipment, e.g. hand set 10.

The control unit 14 stores the calling code applied from line monitor 3 into a predetermined region 15b of memory 15 (step n3).

The control unit 14 may be constructed so as to temporarily store the calling code from line monitor 3 into an internal register (a plurality of registers are generally provided in a microcomputer) and write the calling code into the memory region 15b of memory 15 only at the time of non-response of the response side.

The response/non-response detection of the response side may be implemented by a structure in the line monitor 3 for detecting whether the response code is sent on line 4 and 5 or not, because processing unit 8 sends a code indicating the state of terminal unit 1, such as calling, reference, response, and disconnection. In other words, the calling code may be written into memory 15 only when line monitor 3 detects the disappearance of the calling set up message before the response from the responding side terminal unit 1 and the release of response side terminal unit 1 from line connection by disconnection of the calling side.

A user can advantageously monitor the communication destination from the stored contents by storing the caller's code regardless of the response/non-response of the user.

A caller during the user's absence may be readily specified by storing the calling code of the caller only at the time of non-response.

Figure 5:
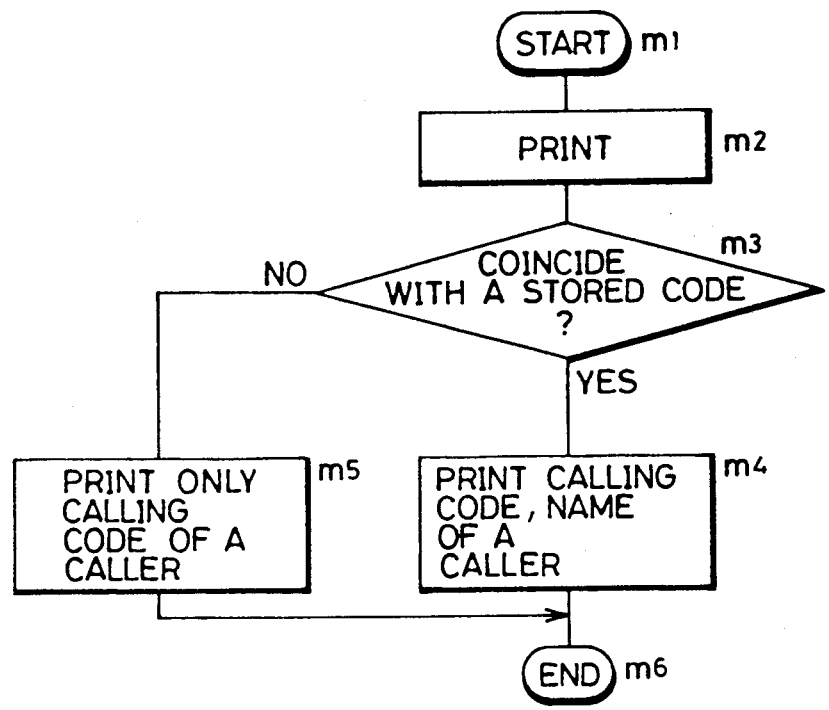
FIG. 5 is a flow diagram showing the operation of the communication unit of FIG. 2 at the time of reading out the memory contents.
Figure 6:
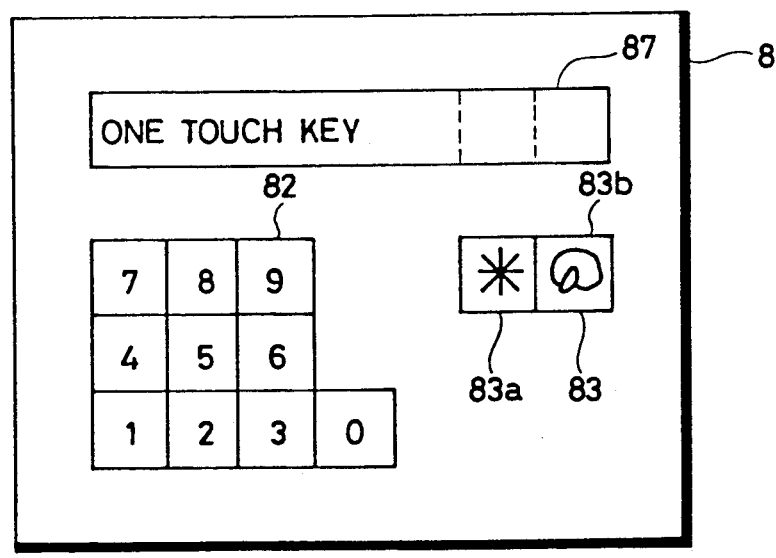
FIG. 6 shows an example of the configuration of the information input keys of the communication unit of FIG. 2.

The operation to identify the caller will be described with reference to the operation flow diagram of FIG. 5.

By operating output request unit 18, an output request is applied to control unit 14 (step m2). The control unit 14 accesses memory 15 in response to this output request, to read out the calling code stored in memory region 15b for making a determination whether or not a calling code that coincides with the read out calling code is stored in memory region 15a (step m3).

When there is a coincident calling code, control unit 14 reads out the corresponding "caller's name" from region 15a of memory 15, and sends this "caller's name" along with the calling code to output unit 16. The output unit 16 prints out the calling code and the "caller's name" applied from the control unit 14 onto recording paper 17 (step m4).

When a coincidence is not detected, the control unit 14 applies only the calling code information to output unit 16. The output unit 16 prints only the applied calling code. At this time, the column of "caller's name" may be either left blank, or filled with a code such as "unidentified" in printing out (step m5).

At step m4, not the calling code, but only the "caller's name" may be printed out.

This operation is carried out to all the calling codes stored in memory region 15a.

The processing unit 8 has ten key 82 for inputting a called code for specifying a destination, and function keys 83 for setting the operation mode. The function keys 83 comprises an abbreviation key 83a indicating that it is an abbreviation code, and a transmission key 83b for instructing the transmission. Communication may be performed using the calling code in region 15a of memory 15 as the called code under the control of processing unit 8, when transmission key 83b is turned to an ON state, by operating the abbreviation key 83a and predetermined keys of ten key 82.

The calling code in memory region 15a may be read out as the called code under the control of processing unit 8 to perform calling, by operating a one touch key 81 provided for dedicated use in processing unit 8.

In the above embodiment, the calling code included in the set up message is stored regardless of the response/non-response at a reference. It is also possible to store the calling code into the memory only at the time of non-response, as mentioned above. The operation thereof will be described with reference to FIG. 7.

Only memory region 15b is provided in memory 15 here.

The line monitor 3 makes a determination whether reference information is transmitted to line 5 or not (step n2). The determination of reference may be carried out by detecting the called code included in the set up message corresponding to the code of terminal unit 1. Alternatively, the existence of reference may be determined in response to the set up message.

When a reference is detected, line monitor 3 extracts the calling code included in the set up message and holds the same. Then line monitor 3 makes a determination whether response comes from the response side terminal unit 1 (step n3). The detection of non-response may comprise the steps of detecting connection of terminal unit 1 to line 7 by reference, and detecting the release of terminal unit 1 from line 7 before a response from terminal unit 1.

When non-response is detected, line monitor 3 applies the temporarily latched calling code to control unit 14 (step n4). The control unit 14 stores the applied calling code into region 15b of memory 15 (step n5).

The line monitor 3 may send the detected calling code to control unit 14 at the time of reference, and transmit to control unit 14 an invalidation signal when non-response is detected and a validation signal when response is detected. In this case, the control unit 14 holds the calling code in a register for example, and invalidates that calling code when an invalidation signal is applied (the reset of register), or writes that calling code into memory 15 when a validation signal is applied.

When a response is detected by line monitor 3 at step n3, communication by terminal 1 is commenced (step n7). When the communication terminates, terminal 1 is disconnected from line 4, and line 7 is brought to a release state.

The read out of the contents of memory 15 is carried out by an output request from output request unit 18. Since memory 15 does not have memory region 15a in this case, the contents of memory region 15b is read out into control unit 14 to be applied to output unit 16. The output unit 16 prints out the applied calling code onto the recording paper.

In this embodiment, memory 15 may include memory region 15a. In this case, the read out and output operation of the memory contents is similar to that shown in FIG. 5.

Although the communication unit is envisaged to be used in the ISDN communication network in the above embodiments, any communication network may be used as long as the calling code and the called code are transmitted together at the time of calling.

Memory 15 may be constructed so as to have the contents of memory region 15a reset, i.e. erased, when necessary.

Thus, since the invention is constructed so as to store the calling code transmitted at the time of reference into a memory and display the contents stored in the memory whenever necessary, a caller at the time of absence of the response side user can be readily identified without paying communication charge.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A communication unit in a digital communication network in which a calling set up message is transmitted to a response side at the time of calling, said calling set up message including a calling code specifying a caller, said unit comprising:
   detecting means responsive to the transmission of said calling set up message to said response side for detecting said calling code from said calling set up message,
   storing means for storing the calling code detected by said calling code detecting means into a first memory region of a memory means,
   accessing means for accessing said first memory region in response to an output instruction to produce information corresponding to said calling code detected by said detecting means, and
   indication means for receiving information accessed by said producing means for providing an indication thereof;
   said detecting means comprising non-response detecting means for detecting a non-response to said calling set up message by said response side;
   said storing means comprising writing means responsive to a non-response detection by said non-response detecting means for storing said detected calling code into a second memory region of said memory means for registration thereof;
   said memory means including a third memory region for pre-storing a plurality of preselected calling codes and caller specification information corresponding to each of said preselected calling codes;
   said accessing means accessing the calling code in said first memory region in response to a read out instruction, said accessing means including means for determining whether or not a calling code coinciding with said accessed calling code is stored in said third memory region;
   read-out means for reading out caller specification information corresponding to a calling code in said third memory region and supplying the same to said indication means when said accessing means indicates a coincidence determination; and
   means for supplying only the read out calling code to said indication means in response to a non-coincidence detection by said determining means.

2. The unit according to claim 1, wherein said read-out means comprises means for applying a coincidence detected calling code along with corresponding caller specification information to said indication means.

3. A communication method in a digital communication network in which a calling set up message is transmitted to a response side at the time of calling, said calling set up message including a calling code specifying the caller, comprising the steps of:
   detecting said calling code from said calling set up message in response to a transmission of said calling set up message to said response side,
   storing the detected calling code into a first memory region of a memory means,
   accessing said memory means in response to an output instruction for producing information corresponding to said detected calling code, and
   receiving the produced information for providing an indication thereof;
   said step of detecting comprising the step of detecting a non-response to a transmitted calling set up message by said response side;
   said step of storing comprising the step of storing the detected calling code into said first memory region of the memory means in response to a non-response detection in said step of detecting a non-response;
   said memory means including a second memory region for storing a plurality of preselected calling codes and caller specification information corresponding to each of said preselected plurality of calling codes;
   said information producing step including the steps of
   reading out the storage contents of said first memory region in response to said read out instruction for making a determination whether or not a calling code coinciding with a read out calling code from said first memory region is stored in said second memory region,
   reading out the caller specification information corresponding to said read out calling code from said second memory region when said determination shows said coincidence for providing said indication, and
   providing only said read out calling code when said determination shows a non-coincidence detection.

4. The method according to claim 2 wherein the step of reading out from said second memory region and providing said indication comprises the step of providing not only said read out caller specification information, but also the coincidence detected calling code for said indication.

5. A communication unit according to claim 1, wherein said second memory region and said third memory region share a common region of said memory means.

6. A communication unit in a digital communication network in which reference information includes a calling code specifying a calling source, said unit comprising:
   detecting means responsive to said reference information for detecting a calling code therefrom;
   determination means for determining whether or not an answering is made to said reference information;
   storage means responsive to said determination means for storing the calling code detected from said reference information in a memory region, when no answering is made to said reference information, for registration thereof;

memory means for storing preselected calling codes and identifying information corresponding to respective preselected calling codes;

comparing means for detecting whether a calling code coinciding with the calling code detected from the reference information is stored in said memory means;

means responsive to an output instruction and to said comparing means for indicating the calling code detected from said reference information when said comparing means detects non-coinciding calling code from said memory means; and means responsive to said output instruction and to said comparing means for indicating an identifying information corresponding to the calling code detected from the reference information when said comparing means detects a coinciding calling code from said memory means.

* * * * *